(12) United States Patent
Heath et al.

(10) Patent No.: US 10,537,990 B2
(45) Date of Patent: Jan. 21, 2020

(54) SPLIT ROBOTIC ARTICLE PICK AND PUT SYSTEM

(71) Applicant: Dematic Corp., Grand Rapids, MI (US)

(72) Inventors: Kevin M. Heath, Clarksville, MI (US); Anthony J. Paniczko, Grand Rapids, MI (US); Mark D. O'Brien, Kentwood, MI (US); Mitchell D. Burkert, Grand Rapids, MI (US); Hau Y. Sze, Grand Rapids, MI (US)

(73) Assignee: Dematic Corp., Grand Rapids, MI (US)

( * ) Notice: Subject to any disclaimer, the term of this patent is extended or adjusted under 35 U.S.C. 154(b) by 0 days.

(21) Appl. No.: 15/938,595

(22) Filed: Mar. 28, 2018

(65) Prior Publication Data
US 2018/0282079 A1 Oct. 4, 2018

Related U.S. Application Data

(60) Provisional application No. 62/478,879, filed on Mar. 30, 2017.

(51) Int. Cl.
*B25J 9/00* (2006.01)
*B65G 1/137* (2006.01)
(Continued)

(52) U.S. Cl.
CPC ............ *B25J 9/0093* (2013.01); *B25J 9/023* (2013.01); *B25J 9/1669* (2013.01); *B25J 9/1682* (2013.01);
(Continued)

(58) Field of Classification Search
CPC ....... B65G 47/907; B65G 1/137; B25J 9/0093
See application file for complete search history.

(56) References Cited

U.S. PATENT DOCUMENTS 8,862,269 B2 * 10/2014 Martinez ................ B25J 9/1687
200/245
9,469,035 B2 * 10/2016 Noda ..................... B25J 9/0018
(Continued)

OTHER PUBLICATIONS

International Search Report and Written Opinion of the International Searching Authority from corresponding Patent Cooperation Treaty (PCT) Application No. PCT/IB2018/052146, indicated completed on Jul. 27, 2018.
(Continued)

*Primary Examiner* — Thomas Randazzo
(74) *Attorney, Agent, or Firm* — Gardner, Linn, Burkhart & Ondersma LLP

(57) ABSTRACT

A method and system for picking articles from a collection of articles and arranging articles into placement locations, includes capturing an image with a first vision system from a collection of articles at a first pick location and determining coordinate data for at least some of the articles in the collection of articles. The coordinate data for an article in the collection of articles is provided to a first robotic manipulator. That article is picked from the collection of articles with the first robotic manipulator according to the coordinate data for that article and that article placed at a first place location. The position and orientation data of that article are obtained at a second pick location and provided along with a desired position and orientation of that article at a second place location to a second robotic manipulator. That article is picked with the second robotic manipulator using the position and orientation data of that article at the second pick location and that article is placed at the second place location at the desired position and orientation.

26 Claims, 2 Drawing Sheets

(51) Int. Cl.
*B25J 9/02* (2006.01)
*B25J 9/16* (2006.01)
*B65G 47/90* (2006.01)

(52) U.S. Cl.
CPC ............ *B25J 9/1697* (2013.01); *B65G 1/137* (2013.01); *B65G 1/1378* (2013.01); *B65G 47/905* (2013.01); *B65G 47/907* (2013.01); *B65G 2201/02* (2013.01); *G05B 2219/39083* (2013.01); *G05B 2219/40554* (2013.01); *G05B 2219/45063* (2013.01); *Y10S 901/07* (2013.01); *Y10S 901/16* (2013.01); *Y10S 901/47* (2013.01)

(56) References Cited

U.S. PATENT DOCUMENTS

| | | | |
|---|---|---|---|
| 9,481,518 B2 * | 11/2016 | Neiser | B65G 1/1378 |
| 9,486,926 B2 | 11/2016 | Kawano | |
| 9,600,798 B2 | 3/2017 | Battles et al. | |
| 9,751,693 B1 * | 9/2017 | Battles | G06Q 10/087 |
| 10,221,015 B2 | 3/2019 | Battles et al. | |
| 2011/0243707 A1 * | 10/2011 | Dumas | B65B 5/105 |
| | | | 414/806 |
| 2012/0205928 A1 | 8/2012 | La Rovere et al. | |
| 2013/0096713 A1 | 4/2013 | Takizawa et al. | |
| 2014/0017048 A1 * | 1/2014 | Mattern | B25J 9/1612 |
| | | | 414/567 |
| 2014/0234066 A1 | 8/2014 | Mathi et al. | |
| 2015/0375398 A1 | 12/2015 | Penn et al. | |
| 2016/0132059 A1 * | 5/2016 | Mason | G05D 1/0246 |
| | | | 701/28 |
| 2016/0140488 A1 | 5/2016 | Lindbo | |
| 2016/0244262 A1 | 8/2016 | O'Brien et al. | |
| 2016/0297611 A1 | 10/2016 | Williams et al. | |
| 2017/0036798 A1 | 2/2017 | Prahlad et al. | |
| 2017/0043953 A1 | 2/2017 | Battles et al. | |

OTHER PUBLICATIONS

Web pages from Baxter Collaborative Robots for Industrial Automation—Rethink Robotics (www.rethinkrobotics.com).

* cited by examiner

SPLIT ROBOTIC ARTICLE PICK AND PUT SYSTEM

CROSS REFERENCE TO RELATED APPLICATIONS

This application claims benefit and priority under 35 U.S.C. § 119(e) of U.S. provisional application Ser. No. 62/478,879, filed Mar. 30, 2017, which is hereby incorporated herein by reference in its entirety.

BACKGROUND OF THE INVENTION

The present invention is directed to a method of picking articles from a collection of mixed orientated articles and arranging the articles into separate placement locations, and an article pick and put system and, in particular, to such a method and system utilizing robotic manipulation. While the invention finds application in order fulfillment system, it may find use in other applications.

Order fulfillment of orders placed over the Internet must take place within a relatively short period of time in order to be commercially competitive. The same could be said for orders received by phone, facsimile, or by the mail based on catalog or television-based merchandizing. Such order fulfillment is known as E-commerce and places demands on an order fulfillment system to meet such obligations. This is compounded by the fact that E-commerce usually involves a large number of small orders (each containing as few as one item in the order) that are selected from a large number of potential items. Each unique item has a specific inventory identification, known in the industry as a stock-keeping unit (SKU). Each item usually bears an optical code, such as a bar code or radio frequency identification (RFID) tag that identifies the SKU of the item.

SUMMARY OF THE INVENTION

Techniques for order fulfillment utilizing robotic manipulation have not been totally satisfactory. A robotic manipulator may be utilized to pick mixed orientated articles from a receptacle and placing the articles into various order receptacles. The robotic manipulator must re-grip the article if the article is not adequately gripped. In another approach, articles are dispensed, such as from a hopper, in a single layer on a conveyor leading to a robotic manipulator. However, it is difficult for vision systems to adequately identify the articles arranged in this manner and guide the robotic manipulator to properly grip the articles on the first attempt. The present invention is intended to overcome insufficient throughput of known techniques. This is accomplished by utilizing multiple robotic manipulators, each to increase the precision with which an article is handled.

A method of picking articles from a collection of articles and arranging articles into placement locations, according to an aspect of the invention, includes capturing an image with a first vision system from a collection of articles at a first pick location and determining coordinate data for at least some of the articles in the collection of articles. The coordinate data for an article in the collection of articles is provided to a first robotic manipulator. That article is picked from the collection of articles with the first robotic manipulator according to the coordinate data for that article and that article placed at a first place location. The position and orientation data of that article as placed by the first robotic manipulator and a subsequent desired position and orientation data of that article at a second place location are provided to a second robotic manipulator. That article is picked with the second robotic manipulator using the position and orientation data of that article as placed by the first robotic manipulator and the subsequent position and orientation data of that article placing the article at the subsequent desired position and orientation with the second robotic manipulator.

The first place location and a second pick location may be spaced apart from each other and including transporting articles from the first place location to the second pick location. The position and orientation data of that article at the second pick location may be obtained or confirmed. Such obtaining or confirming may include capturing an image of that article at the second pick location with a second vision system and confirming the position and orientation of that article at the second pick location with the second vision system. Article receptacles may be positioned at the second place locations and an image of articles in a receptacle may be captured with a third vision system. Location of a receptacle, orientation of a receptacle, size of a receptacle, percentage fill of a receptacle, and/or positions of articles in a receptacle may be determined. The first place location may include a conveying surface and the transporting include conveying articles at the first place location with the conveying surface to the second pick location.

An article pick and put system, according to an aspect of the invention, includes a first robotic system and a second robotic system. The first robotic system includes a first vision system and a first robotic manipulator. The second robotic system includes a second vision system and a second robotic manipulator. An article support is provided at a first pick location, an article support is provided at a second place location. The first vision system obtains coordinates of an article at the first pick location and the first robotic manipulator responds to the coordinates of that article to pick that article from the first pick location and place that article at the first place location. The second vision system obtains data from an article at the second pick location and the second robotic manipulator responds to the second vision system to pick that article at the second pick location and place that article in another desired position and orientation at the second place location.

The first robotic manipulator may be adapted to place that article at the first place location and the second robotic manipulator adapted to pick that article at the second pick location that is spaced from the first pick location and a conveyance device conveys articles received from the first place location to the second pick location. The conveyance device may be a conveyor such as an accumulation conveyor. The first robotic manipulator may pick articles from a receptacle at the first pick location and the first vision system captures coordinates for at least some of the articles in a receptacle. A scanner may be provided at the conveyance device to capture additional data regarding each article being conveyed by the conveyance device. The scanner may be a scan tunnel that scans multiple sides of an article to read an optical code on any side of an article.

A second conveyance device may be provided to convey a receptacle from the first pick location after said first robotic manipulator picks at least one article from that receptacle. A third vision system may be provided to obtain data at the second place location. The second place location may define a plurality of order locations and each of the order locations may support a receptacle.

The first vision system may be operable with image processing software to sense article identifier, article dimensions, article volume, article location, and article orientation in space and/or article color. The second vision system may be operable with image processing software to sense article presence, article identity, article position and/or article orientation in space. The third vision system may be operable with image processing software to sense receptacle location, receptacle orientation, receptacle size, receptacle percent fill, and/or article position. The first vision system may be mounted to the first robotic manipulator or an end-of-arm tool on the first robotic manipulator. The second vision system or the third vision system may be mounted to the second robotic manipulator or an end-of-arm tool on said second robotic manipulator.

An automated shuttle may be provided that is adapted to remove completed receptacles from the second place location. The system automated shuttle may be adapted to deliver completed receptacles for retrieval by an in/out robotic manipulator.

These and other objects, advantages and features of this invention will become apparent upon review of the following specification in conjunction with the drawings.

DETAILED DESCRIPTION OF THE PREFERRED EMBODIMENTS

Figure 1:
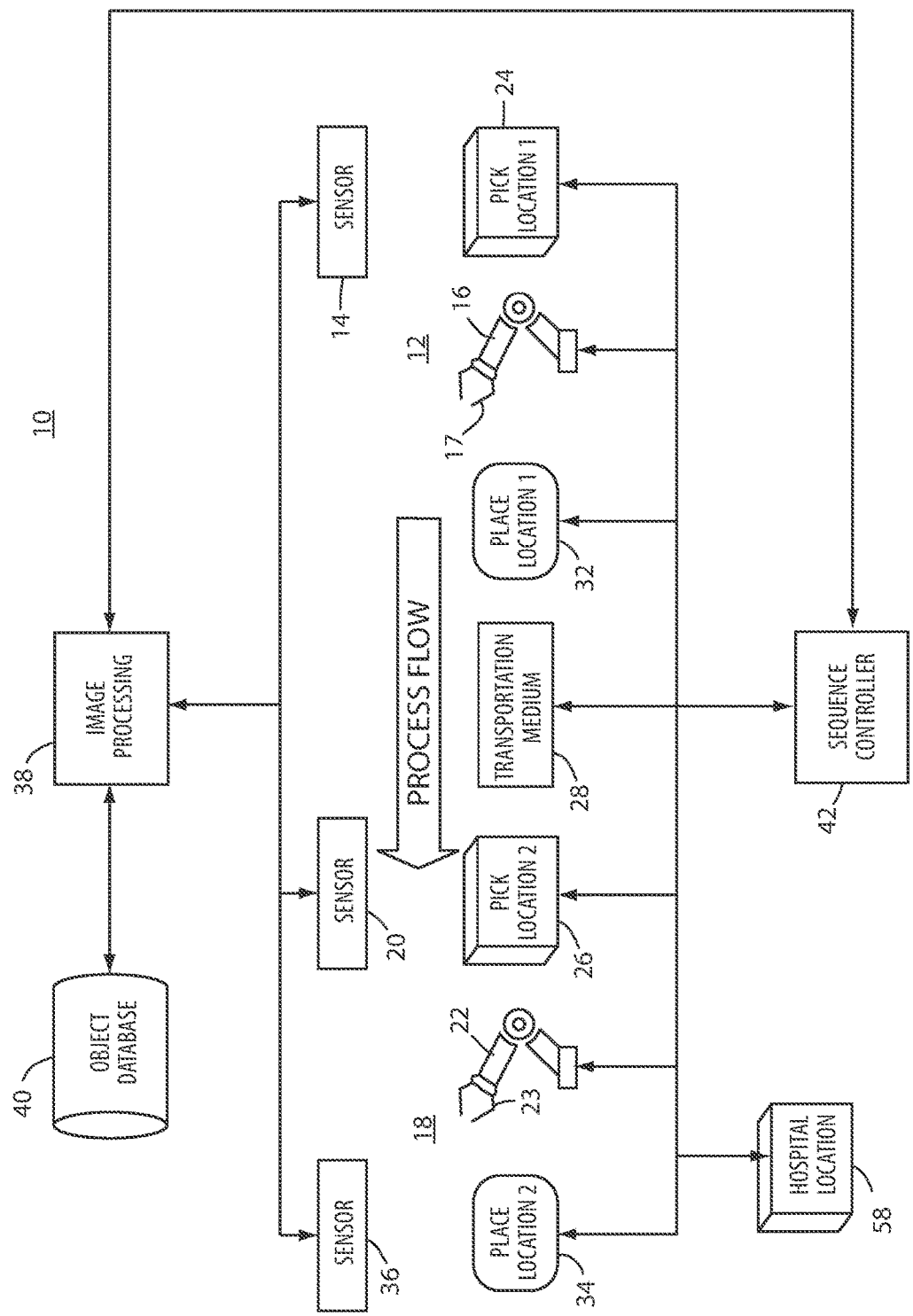
FIG. 1 is a block diagram of a method of picking articles and article picking system according to an embodiment of the invention.

Referring now to the drawings and the illustrative embodiment depicted therein, a method of picking and putting articles is carried out by an article pick and put system 10. Articles are picked from a collection of articles that may be a collection of mixed orientated articles. The picked articles are ultimately arranged into separate placement locations. Articles may have mixed or non-mixed orientation. Mixed orientation means the articles do not have an organized orientation. In the illustrated embodiment, articles are picked from a receptacle of inventory items that are supplied in a mixed orientation in the inventory receptacles and placed into order receptacles arranged according to customer orders or the like. However, embodiments of the invention may be used with articles not in receptacles.

Pick and put system 10 includes a first robotic system 12 and a second robotic system 18. First robotic system 12 includes a first vision system 14 and a first robotic manipulator 16, such as a 6-axis robotic arm of the type known in the art. An end-of-arm tool (EOAT) 17 is provided at the end of robotic manipulator 16 and may provide access to multiple different types of interface tools. First vision system 14 may be stationary or mounted to robotic manipulator 16 or EOAT 17. First vision system 14 captures images at a first pick location 24. First robotic manipulator 16 is capable of picking an article from first pick location 24 and placing that article to a first place location 32.

Second robotic system 18 includes a second vision system 20 and a second robotic manipulator 22 such as a 6-axis robotic arm of the type known in the art. An end-of-arm tool (EOAT) 23 is provided at an end of second robotic manipulator 22 and may provide access to multiple different types of interface tools. Second vision system 20 may be stationary or mounted to second robotic manipulator 22 or to EOAT 23. Second vision system 20 captures images at a second pick location 26. Second robotic manipulator 22 is capable of picking an article from second pick location 24 and placing that article to a second place location 34. A third vision system 36 may be provided to capture images at second place location 34.

Sensor data collected with first vision system 14, second vision system 20 and third vision system 26 is utilized by image processing software 38 as well as pre-determined information about articles handled by the first and second robotic system contained in an object database 40. A sequence controller 42 receives inputs from image processing software 38 and controls operation of robotic manipulators 16, 22, and a conveyance device 28.

It would be possible for first place location 32 and second pick location 26 to coincide such that first and second robotic manipulators 16, 22 access this common location. However, such arrangement would require coordination between the robotic manipulators so that only one manipulator accesses the common location at a time to avoid collision. This would slow down the robotic manipulators since one would need to pause while the other accesses the common location. Conveyance device 28 conveys articles from first place location 32 to second pick location 26 thus providing separate locations so no coordination between the robotic manipulators is required. Conveyance device 28 may have a conveying surface, such as a belt or roller conveyor or may otherwise transport articles. Also, conveyance device 28 may be an accumulation conveyor to provide for accumulation of articles. This further increases the flexibility of the system by allowing the robotic manipulators to operate at different speeds while any temporary excess of articles picked by first robotic manipulator 16 over those placed by second robotic manipulator 22 be absorbed by the accumulation capabilities of conveyance device 28.

Figure 2:
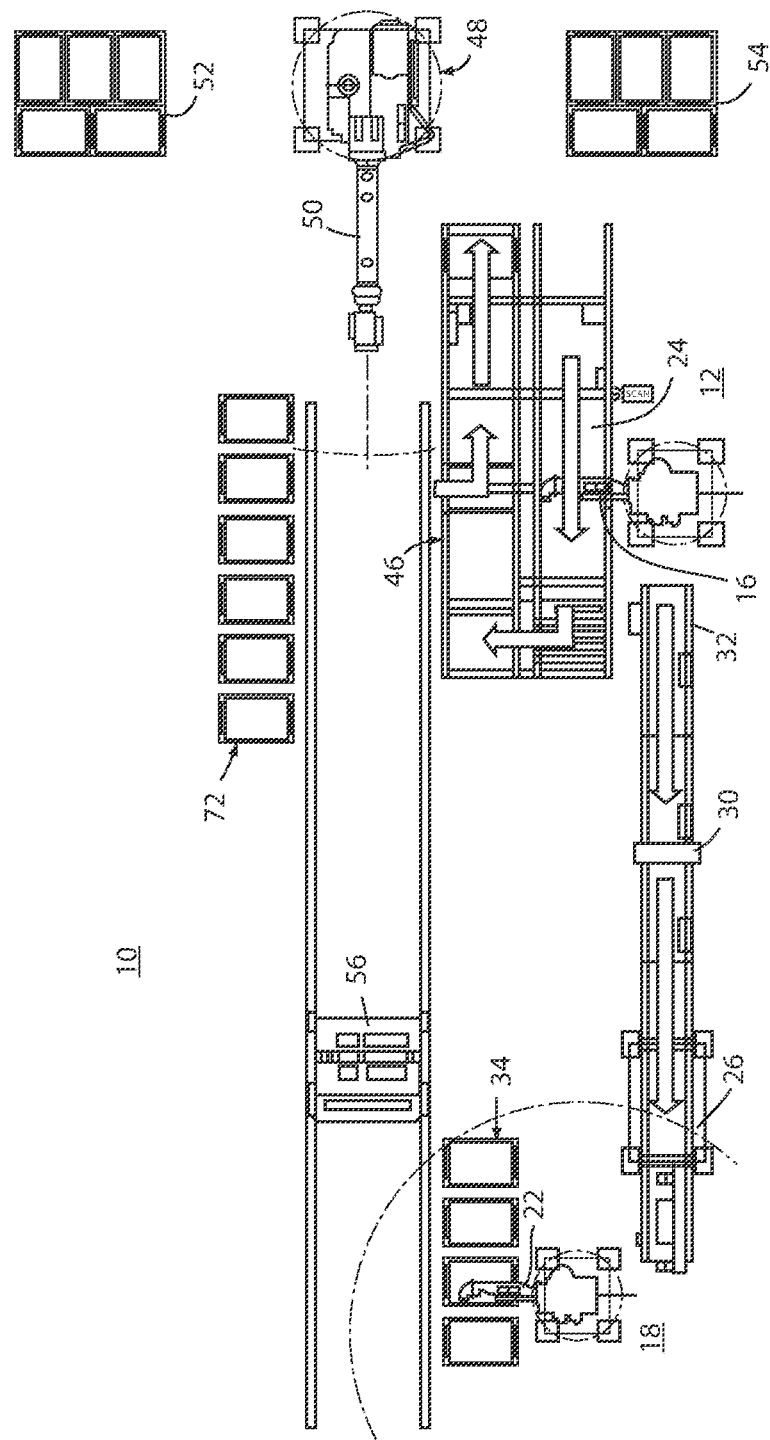
FIG. 2 is a top plan view of an article picking system according to an embodiment of the invention.

Receptacles of articles to be picked, such inventory articles, are supplied to first pick location 24 from a supply of inventory receptacles 54 by an in/out robotic manipulator 50 of an in/out robotic system 48 (FIG. 2). A conveyor 46 returns inventory receptacles to robotic manipulator 50 after one or more inventory items are removed by first robotic manipulator 16. Using first vision system 14 in conjunction with image processing software 38 and object database 40, information about the articles in the inventory receptacle at first pick location 24 is obtained. Such information for the articles may include, for example, unique identifiers such as bar codes or the like and unique stock keeping unit codes (SKU) for each of the visible articles as well as dimensions, cubic volume, position, and orientation in space and color of the visible articles. The sensor data collected by first vision system 14 will be utilized by image processing software 38 as well as pre-determined information about the articles retrieved from object database 40 to determine how an article should be picked by first robotic manipulator 16. Pick location data will be provided to first robotic manipulator 16 from sequence controller 42 including coordinate data of the article to be picked. The coordinate data may include three spatial parameters and three rotational parameters. If EOAT 17 has multiple tools, information about which tool to be used is also provided by sequence controller 42 along with the coordinate data. When the item(s) are picked from the inventory receptacle, the receptacle is returned by conveyor 46 to a return position 63, where it may be accessed by in/out robotic manipulator 48 to place the receptacle on receptacle supply 54 or other location to place the receptacle into inventory.

Robotic manipulator 16 may place the picked article at any generally random position or orientation at first place location 32. Alternatively, a desired placement position and orientation of the article at first place location 32 may also be supplied to first robotic manipulator as coordinate data. This will allow the position and orientation of the article to be established at first place location 32. Conveyance device 28 conveys articles from first place location 32, which may be a location at an upstream end of a conveying surface, to second pick location 26. Conveyance device 28 may allow for the accumulation of articles as previously described. This allows for the robotic manipulators to run at different rates and provides the ability to feed articles to specific downstream locations based on process requirements. An optional tunnel scanner 66 provides the ability to scan all six sides of each article in order to confirm the identity of that article by capturing a bar code or the like. At the second pick location 26, second vision system 20 gathers information about the article and establishes or confirms the information about the object provided by first vision system 14, such as article identification, position, and orientation. Second vision system 20 in conjunction with image processing software 38 and object database 40 provides final placement (position and orientation) of the article at second pick location 26 and provides these coordinates to second robotic manipulator 22. Information about which tool to use is provided to EOAT 23 by controller 42.

A plurality of receptacles are provided at second place location 34. Second robotic manipulator 22 will use the data provided from controller 42 to pick up the article and orient it so that it can be placed into a desired one of the receptacles at second place location 34. A third vision system 36 may be located at second place location 34 or may be mounted to second robotic manipulator 22. The third vision system is utilized to gather information about the receptacles at second place location 34 including location, orientation, size, percent full, and orientation of articles in the receptacle. The data gathered by the third vision system is utilized by image processing software 38 to confirm the article's final place coordinates for the second robotic manipulator. The second robotic manipulator will use the coordinate data provided by sequence controller 42 to place the article into a receptacle at second place location 34, such as at a desired position and orientation. The third vision system 36 may also provide real time updates to the second robotic manipulator to provide closed loop control during placement of the article.

If during any of the placement operations, an impediment to successful article placement is detected by sequence controller 42 or image processing software 38, the robotic manipulator may return the article being placed to its original location and the placement process re-initiated. Alternatively, the robotic manipulator may be instructed to move the article so an alternative place location such as a hospital location 58 where the article may be handled manually.

An automated shuttle 56 may be provided to remove completed receptacles from second place location 34 and deliver them to conveyor 46 for retrieval by in/out robotic manipulator 50 which places the order receptacle on an order pallet 52. Shuttle 56 may also supply empty or partially empty receptacles to second place location 34 from an empty receptacle storage area 72. It should be understood that each receptacle at second place location 34 may be filled with a single or multiple customer orders or may contain partial customer orders. Also, the inventory receptacles and/or order receptacles may be stored in an automated warehouse of the type marketed by Dematic GmbH under the Multishuttle brand which may be accessed by automated shuttle 56.

While the foregoing description describes several embodiments of the present invention, it will be understood by those skilled in the art that variations and modifications to these embodiments may be made without departing from the spirit and scope of the invention, as defined in the claims below. The present invention encompasses all combinations of various embodiments or aspects of the invention described herein. It is understood that any and all embodiments of the present invention may be taken in conjunction with any other embodiment to describe additional embodiments of the present invention. Furthermore, any elements of an embodiment may be combined with any and all other elements of any of the embodiments to describe additional embodiments.

The embodiments of the invention in which an exclusive property or privilege is claimed are defined as follows:

1. An article pick and put system, comprising:
   a first robotic system comprising a first vision system and a first robotic manipulator;
   a second robotic system comprising a second vision system and a second robotic manipulator;
   an article support at a first pick location and an article support at a second place location;
   said first vision system adapted to obtain coordinates of an article at said first pick location and said first robotic manipulator adapted to respond to the coordinates of that article to pick that article from said first pick location and place that article at a first place location;
   said second vision system adapted to obtain position and orientation data of an article at a second pick location and said second robotic manipulator adapted to respond to said second vision system to pick that article at the article's position and orientation at said second pick location and place that article at a receptacle placement location of one of a plurality of receptacles at the second place location; and
   wherein said first robotic manipulator is adapted to at least place an article at the first place location and said second robotic manipulator is adapted to at least pick that article substantially without conflict with said first robotic manipulator, such that said first and second robotic manipulators are operable at different speeds.

2. The system as claimed in claim 1 wherein said first robotic manipulator is adapted to pick articles from a receptacle at said first pick location and wherein said first vision system is adapted to capture coordinates for at least some articles in the receptacle.

3. The system as claimed in claim 1 wherein said first vision system is operable with image processing software to sense at least one chosen from article identifier, article dimensions, article volume, article location, article orientation in space, and article color.

4. The system as claimed in claim 1 wherein said second vision system is operable with image processing software to sense at least one chosen from article presence, article identity, article position and article orientation in space.

5. The system as claimed in claim 1 wherein said first vision system is mounted to said first robotic manipulator or an end-of-arm tool on said first robotic manipulator.

6. The system as claimed in claim 1 wherein said second vision system is mounted to said second robotic manipulator or an end-of-arm tool on said second robotic manipulator.

7. The system as claimed in claim 1 including a third vision system adapted to obtain data at said second place location.

8. The system as claimed in 7 wherein said third vision system is adapted to sense at least one chosen from receptacle location, receptacle orientation, receptacle size, receptacle percent fill, and article position.

9. The system as claimed in claim 1 wherein said second robotic manipulator adapted to pick the article at the position and orientation of the article at a second pick location that is spaced from said first place location and including a conveyance device adapted to convey articles from said first place location to said second pick location.

10. The system as claimed in claim 9 wherein said conveyance device comprises a conveyor.

11. The system as claimed in claim 9 including a scanner at said conveyance device, said scanner adapted to capture additional data regarding each article being conveyed by said conveyance device.

12. The system as claimed in claim 1 wherein said second place location defines a plurality of order locations.

13. The system as claimed in claim 12 wherein each of said order locations is adapted to support a receptacle.

14. The system as claimed in claim 13 including an automated shuttle that is adapted to remove completed receptacles from said second place location.

15. The system as claimed in claim 14 wherein said automated shuttle is adapted to deliver completed receptacles for retrieval by an in/out robotic manipulator.

16. A method of picking articles from a collection of articles and arranging the articles into receptacles at placement locations, said method comprising:
capturing an image with a first vision system from a collection of articles at a first pick location and determining coordinate data with an image processor for at least some of the articles in the collection of articles;
providing the coordinate data with a sequence controller for an article in the collection of articles to a first robotic manipulator;
picking that article from the mixed collection of articles with said first robotic manipulator according to the coordinate data for that article;
placing that article at a first place location by said first robotic manipulator;
determining, with a second vision system and the image processor, the position and orientation data of that article as placed by the said first robotic manipulator and a receptacle placement location of one of the receptacles for that article;
providing, with the sequence controller, the receptacle placement location data of that article to a second robotic manipulator;
picking that article with said second robotic manipulator using the position and orientation data of that article as placed by said first robotic manipulator and as determined by the second vision system and the image processor; and
placing that article at the receptacle placement location with said second robotic manipulator;
wherein said picking of the article with said second robotic manipulator is substantially without conflict with said placing of that article at the first place location with said first robotic manipulator, wherein said first and second robotic manipulators are operable at different speeds.

17. The method as claimed in claim 16 wherein said second robotic manipulator picks that article at a second pick location that is spaced from the first place location and including transporting articles from the first place location to the second pick location.

18. The method as claimed in claim 17 including capturing an image of that article at said second pick location with a second vision system.

19. The method as claimed in claim 17 wherein said first place location comprises a conveying surface and wherein said transporting including conveying articles at said first place location with said conveying surface to said second pick location.

20. The method as claimed in claim 17 including obtaining or confirming the position and orientation data of that article at the second pick location.

21. The method as claimed in claim 20 including capturing an image of that article at said second pick location with a second vision system.

22. The method as claimed in claim 21 including article receptacles positioned at said second place locations and including capturing an image of articles in said receptacles with a third vision system.

23. The method as claimed in claim 22 including determining receptacle information of at least one chosen from location of a receptacle, orientation of a receptacle, size of a receptacle, percentage fill of a receptacle and positions of articles in a receptacle.

24. An article pick and put system, comprising:
a first robotic system comprising a first vision system and a first robotic manipulator;
a second robotic system comprising a second vision system and a second robotic manipulator;
an article support at a first pick location and an article support at a second place location;
said first vision system adapted to obtain coordinates of an article at said first pick location and said first robotic manipulator adapted to respond to the coordinates of that article to pick that article from said first pick location and place that article at a first place location;
said second vision system adapted to obtain position and orientation data of an article at a second pick location and said second robotic manipulator adapted to respond to said second vision system to pick that article at the article's position and orientation at said second pick location and place that article at a placement location at the second place location;
wherein said second robotic manipulator adapted to pick the article at the position and orientation of the article at said second pick location that is spaced from said first place location and including an accumulation conveyor adapted to convey articles from said first place location to said second pick location.

25. An article pick and put system, comprising:
a first robotic system comprising a first vision system and a first robotic manipulator;
a second robotic system comprising a second vision system and a second robotic manipulator;
an article support at a first pick location and an article support at a second place location;
said first vision system adapted to obtain coordinates of an article at said first pick location and said first robotic manipulator adapted to respond to the coordinates of that article to pick that article from said first pick location and place that article at a first place location;
said second vision system adapted to obtain position and orientation data of an article at a second pick location and said second robotic manipulator adapted to respond to said second vision system to pick that article at the article's position and orientation at said second pick location and place that article at a placement location at the second place location;

wherein said second robotic manipulator adapted to pick the article at the position and orientation of the article at said second pick location that is spaced from said first place location and including a conveyance device adapted to convey articles from said first place location to said second pick location; and a scanner at said conveyance device, said scanner adapted to capture additional data regarding each article being conveyed by said conveyance device, wherein said scanner comprises a scan tunnel that is adapted to scan multiple sides of an article to read an optical code on any side of an article.

26. An article pick and put system, comprising:

a first robotic system comprising a first vision system and a first robotic manipulator;

a second robotic system comprising a second vision system and a second robotic manipulator;

an article support at a first pick location and an article support at a second place location;

said first vision system adapted to obtain coordinates of an article at said first pick location and said first robotic manipulator adapted to respond to the coordinates of that article to pick that article from said first pick location and place that article at a first place location;

said second vision system adapted to obtain position and orientation data of an article at a second pick location and said second robotic manipulator adapted to respond to said second vision system to pick that article at the article's position and orientation at said second pick location and place that article at a placement location at the second place location;

wherein said second robotic manipulator adapted to pick the article at the position and orientation of the article at said second pick location that is spaced from said first place location and including a conveyance device adapted to convey articles from said first place location to said second pick location; and a second conveyance device that is adapted to convey a receptacle from said first pick location after said first robotic manipulator picks at least one article from that receptacle.

* * * * *